(12) United States Patent
Gerlach

(10) Patent No.: US 6,618,172 B1
(45) Date of Patent: Sep. 9, 2003

(54) DRIVE SYSTEM FOR DIGITIZING SCANNING APPARATUS

(76) Inventor: Richard K. Gerlach, 32 Santa Bella Rd., Rolling Hills Estates, CA (US) 90724

(*) Notice: Subject to any disclaimer, the term of this patent is extended or adjusted under 35 U.S.C. 154(b) by 0 days.

(21) Appl. No.: 09/594,074

(22) Filed: Jun. 14, 2000

(51) Int. Cl.⁷ .............................. H04N 1/04; B65H 5/04; B65H 29/20
(52) U.S. Cl. .................... 358/496; 358/496; 358/498; 271/272; 271/314
(58) Field of Search ................................ 271/272, 314, 271/3.01, 3.14, 4.08, 8.1; 358/278, 496, 498

(56) References Cited

U.S. PATENT DOCUMENTS 5,093,734 A * 3/1992 Gerlach ..................... 358/474

* cited by examiner

*Primary Examiner*—Edward Coles
*Assistant Examiner*—Jason Sherrill
(74) *Attorney, Agent, or Firm*—Robert J. Schaap

(57) ABSTRACT

A drive system for a digitizing scanning apparatus of the type which scans an image, such as a light transmissive document in the nature of an x-ray or the like, and enables generation of digital signals representative of that image. The drive system is uniquely designed with three main drive rollers and a pair of idler rollers operable in combination therewith for driving the light transmissive document in such manner that there is a relatively constant drive force on the document which is independent of document thickness and which also allows for a uniform driving movement without any shatter or vibration in the document, which would otherwise distort and materially interfere with proper screening and digitizing of the document.

15 Claims, 2 Drawing Sheets

DRIVE SYSTEM FOR DIGITIZING SCANNING APPARATUS

BACKGROUND OF THE INVENTION

1. Field of the Invention

This invention relates in general to certain new and useful improvements in digitizing scanning apparatus and to drive systems for digitizing scanning apparatus and, more particularly, to a drive system which enables a constant drive pressure against a document being scanned regardless of document thickness and which also eliminates any chatter or vibration which could otherwise result in interference with the scanning and reading operation.

2. Brief Description of the Related Art

In recent years, there has been a increased interest in digital scanning apparatus for purposes of generating a digital image of a document which may be transmitted via telephone links or the like. One area in particular which finds effective use of a digitized image of a document is the medical industry in which digital images of x-rays, mammograms and the like can be made for record and storage purposes and which can also be transmitted to a remote site for reading by an expert in a particular area of radiological reading and scanning.

One of the principle problems which occur with the conventionally available drive systems is that the drive system must be capable of accommodating films or other documents of varying thicknesses. Thus, one document may have a slightly different thickness compared to another document. Even more so, there are even non-linearities in the thicknesses of a document, such as a light transmissive film. Unless the drive system is capable of accommodating these non-linearities, different drive pressures will result and, hence, the documents may be driven at different speeds and even at varying speeds. This, in and of itself, will materially interfere with the accuracy of material which is scanned and, hence, the accuracy of any document which is read.

In the prior art drive systems, all of the drive rollers which were used for moving of the film or other document were not necessarily driven at the same surface speed. This difference in surface velocity, no matter how small, resulted in chatter in the film or other document. In addition, either the drive rollers or the idler rollers, or both, were formed of a material which provided a reasonable coefficient of friction, such as rubber or the like. Although this provided good contact, the amount of force applied by the roller would vary from roller to roller. This coupled with variations in film thickness affected the force applied to the film and, hence, the accuracy of driving of the film through the system.

In one prior art digitizing scanning apparatus, a document was moved through a scanning path by means of a drive mechanism which relied upon drive rollers and cooperating idler rollers. However, the idler rollers and the drive rollers were fixed in position relative to one another in order to create a gap approximately the thickness of the document being fed. This device provided no adjustability and, therefore, a document of non-uniform thickness or otherwise a document having a greater or lesser thickness than normal resulted in different driving pressure on that document. Hence, there was a variation in the speed of the document passing through the scanning path.

One prior art device which was moderately effective was that taught in my U.S. Pat. No. 5,093,734, dated Mar. 3, 1992. In this digitizing drive system, a plurality of floating idler rollers were used with drive rollers disposed beneath the idler rollers. The idler rollers were mounted for vertical shiftable movement in order accommodate documents having a greater or lesser thickness then the gap between the rollers. Adjustment screws were even provided for this purpose. However, the adjustability did not overcome the precise need for uniform driving pressure imposed on the document and clearly did not overcome the chatter resulting from the drive system.

There has been a need for a drive system capable of moving documents through a scanning path with uniform pressure applied to the document regardless of document thickness and also which does not create any chatter in the driving process.

OBJECTS OF THE INVENTION

It is, therefore, one of the primary objects of the present invention to provide a drive system for digitizing scanning apparatus which allows for a document to be driven through a scanning path with a uniform drive pressure and at a uniform speed regardless of variations in the thickness of the document or variations between thicknesses of successive documents.

It is another object of the present invention to provide a drive system for digitizing scanning apparatus of the type stated in which both drive rollers and idler rollers are mounted in such manner that chatter or other vibration does not result with respect to the document being scanned.

It is a further object of the present invention to provide a drive system for digitizing scanning apparatus of the type stated in which idler rollers and drive rollers are mounted in such manner that they automatically separate to provide a gap of proper thickness for a document being driven without requiring manual intervention and which nevertheless provides a uniform driving pressure.

It is an additional object of the present invention to provide a drive system for digitizing scanning apparatus of the type stated which can be constructed at a relatively low cost, but which is nevertheless highly efficient in operation.

It is still another object of the present invention to provide a drive system for digitizing scanning apparatus of the type stated which provides indication if the document being scanned is not moving or is otherwise not moving at a proper speed.

It is another salient object of the present invention to provide a method for moving a document through a scanning apparatus with generally uniform driving force applied to the document independently of the thickness of the document and which eliminates any potential imposition of chatter on that document.

With the above and other objects in view, my invention resides in the novel features of form, construction, arrangement and combination of parts presently described and pointed out in the claims.

BRIEF SUMMARY OF THE INVENTION

The present invention relates primarily to a drive system used with digitizing scanning apparatus. The digitizing scanning apparatus of the type with which the drive system is used generally scans a document, such as a light transmissive document in the nature of an x-ray or a mammogram or the like, and stores a digital signal representative of that document. The stored digital signals in combination can be transmitted as, for example, over telephone lines or the like, and regenerated to create a copy of that image at a distant location.

The drive system of the present invention is designed to move a document being scanned through the scanning apparatus in such manner that it will always move at a uniform drive speed regardless of differences in the thickness between successive documents or regardless of variations in the uniformity of thickness of a document. The drive system is uniquely constructed to automatically accommodate for these thickness variations. In addition, the drive system is constructed so that no chatter or vibration is imposed on the document being driven, such that uniform and accurate scanning can be obtained.

The drive system of the invention includes three main drive rollers which are loaded against one another, although they do have some floating characteristics. The loading is vertically arranged, such that an uppermost roller applies pressure to an intermediate roller which, in turn, applies a driving pressure to a lowermost of the rollers. A pair of idler rollers are also employed and are arranged to be in contact with or otherwise juxtaposed to the uppermost of the drive rollers and the lowermost of the drive rollers. No springs are employed in the mounting of the rollers, and hence, there is no variation in force provided by springs.

The idler rollers are actually mounted in a floating manner on pins so that the idler rollers can be shifted slightly away from the drive rollers in order to accommodate film thickness variations. The idler rollers are effectively floated for a limited degree so that each idler roller can be biased upwardly or downwardly and to a slight degree away from or toward the drive roller against which it is juxtaposed. This occurs automatically without the need for adjustment screws, such as set screws.

The invention can be described in general terms as a drive system for a digitizing scanning apparatus and which provides for scanning and digitizing information on a document. The drive system allows for a uniform driving force to be applied to a scanned document without the imposition of a chatter to that document. In this case, the drive system comprises a first drive roller and a second drive roller located in generally vertically spaced apart arrangement. A third drive roller is located intermediately between and has its axis of rotation offset from the axis of rotation of the first and second drive rollers. The third drive roller provides a driving contact between the first two drive rollers.

Means provides a driving force to one of the drive rollers causing this drive roller to become a powered drive roller. This driving force is imparted to the other of the drive rollers. Finally, at least one idler roller is disposed in juxtaposed relationship to one of the drive rollers and remains in contact with that drive roller until a document is received. The idler roller then shifts in response to thickness of the document and forms a gap between the drive roller of proper thickness to receive the document therebetween. That gap is only the thickness of the document.

In more detail, the idler roller is a floating idler roller, such that it can be biased upwardly and away from the drive roller with which it cooperates. In a more preferred embodiment, a pair of the idler rollers are employed. In this preferred arrangement, one of the idler rollers operates in juxtaposed relationship to a first of the drive rollers and a second of the idler rollers operates in juxtaposed relationship to the second of the drive rollers. The idler rollers and the associated drive rollers are located so that the idler rollers shift and form a gap of proper thickness to which receive the document to be scanned. Thus, the idler roller and associated driver roller are always in contact and ready to receive a document to be scanned.

The invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention, but it is to be understood that such detailed description is not to be taken in a limiting sense.

BRIEF DESCRIPTION OF THE DRAWINGS

Figure 1:
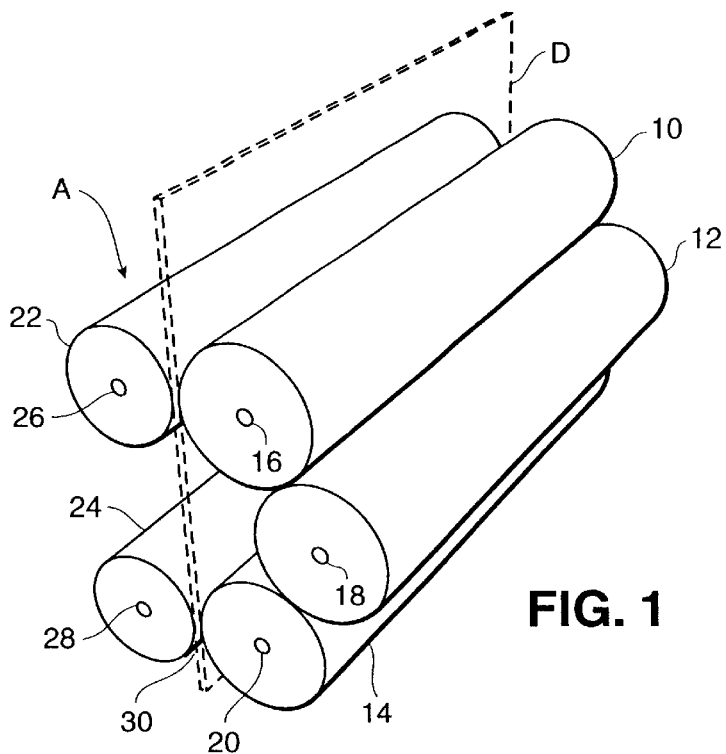
Figure 2:
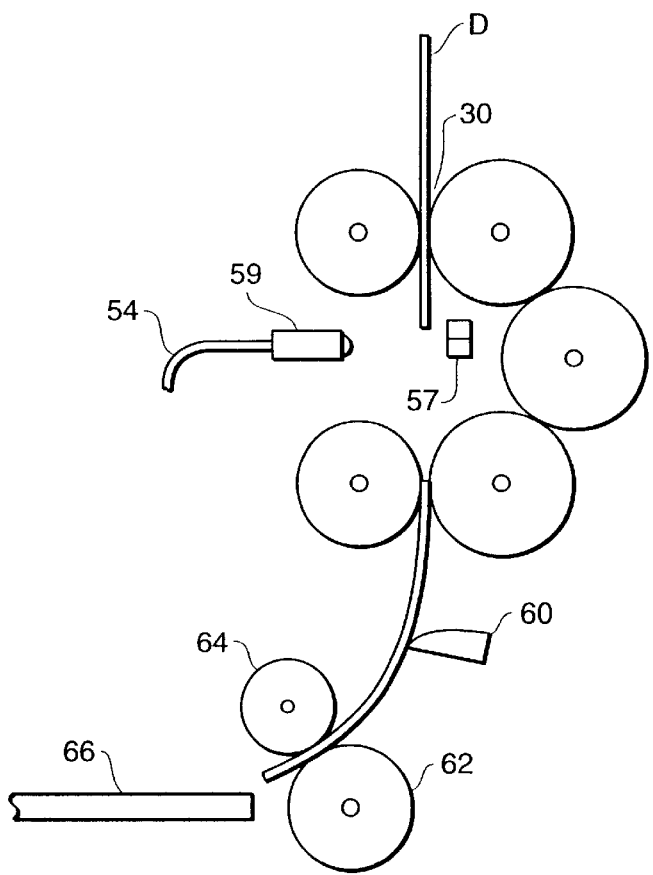
Figure 3:
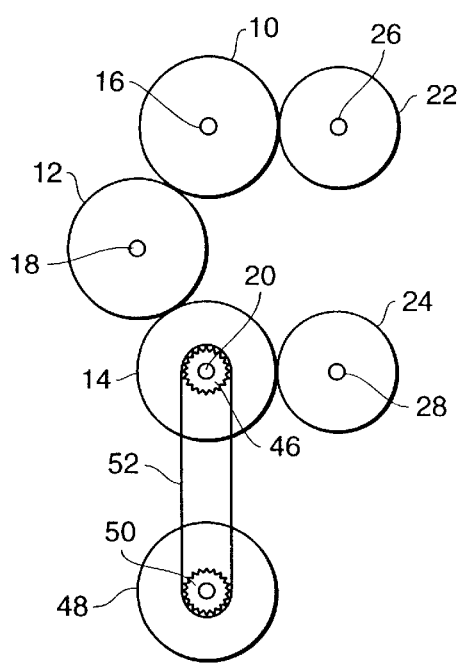
Figure 4:
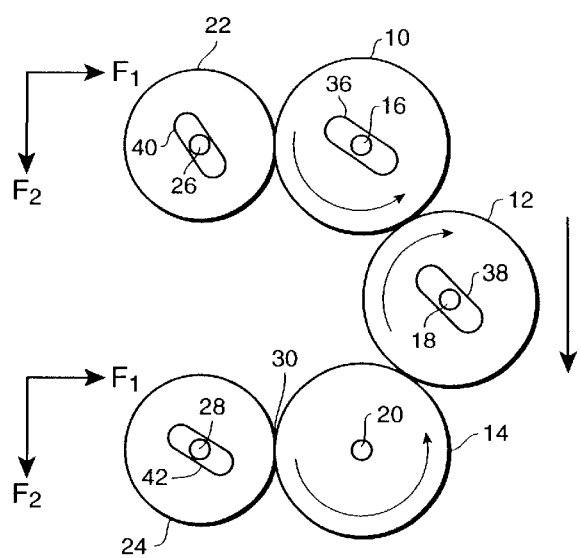
Figure 5:
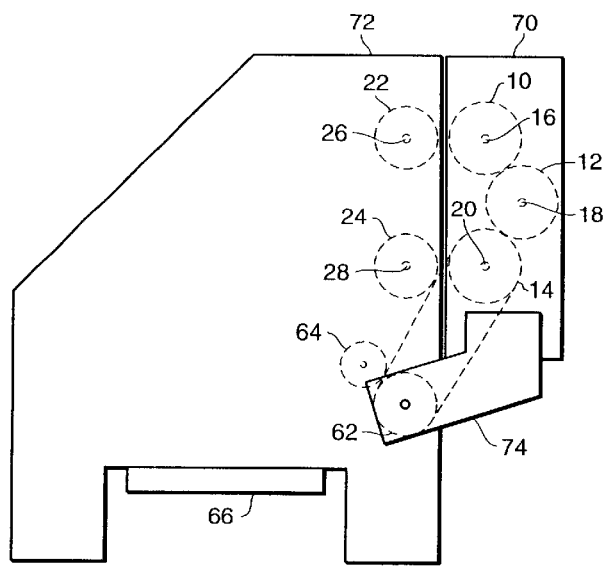
Figure 6:
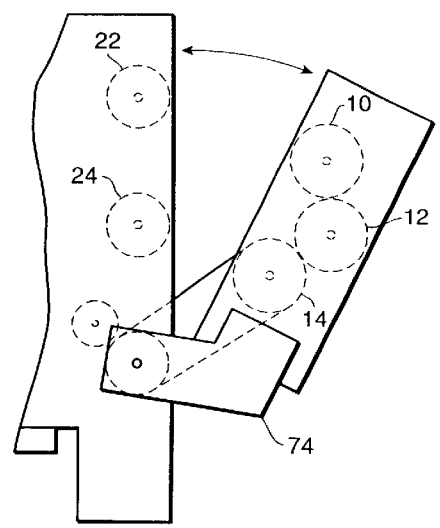

Having thus described the invention in general terms, reference will now be made to the accompanying drawings in which:

FIG. 1 is a somewhat schematic perspective view showing the drive system of the present invention;

FIG. 2 is a schematic side elevational view showing the major components of the drive system of the present invention;

FIG. 3 is an opposite side elevational view showing the major components of the drive system of the present invention;

FIG. 4 is a schematic side elevational view showing a force diagram for the forces imposed on the drive rollers and idler rollers in the drive system;

FIG. 5 is a side elevational view of a housing with the drive system of the present invention; and FIG. 6 is a fragmentary side elevational view and showing the rear frame portion of the housing shifted relative to the main frame thereof.

DETAILED DESCRIPTION OF A PREFERRED EMBODIMENT

Referring now in more detail and by reference characters to the drawings, which illustrate preferred embodiments of the present invention, A designates a drive system for use with a digitizing scanning apparatus and which allows for the scanning of a document D. In the preferred embodiment, this document D is transmissive of light and may be in the nature of an x-ray film or the like.

The drive system A comprises three drive rollers 10, 12 and 14 and each of which are mounted on drive shafts 16, 18 and 20, respectively. The rollers are secured to the drive shafts so that they rotate with the respective drive shafts.

By reference to FIGS. 1, 2 and 4, it can be seen that each of the rollers 10, 12 and 14 have the approximately same diametrical size and, moreover, the respective drive shafts 16, 18 and 20 similarly have approximately the same diametrical size.

The drive rollers 10 and 14 have their respective drive shafts 16 and 20 lying a plane which is essentially parallel to the plane of the document D as it passes between idler rollers, hereinafter described, and the drive rollers 10 and 14.

The drive roller 12 has its axis of rotation parallel in space to the axis of rotation of the rollers 10 and 14, but offset from the plane in which the shafts 16 and 20 are located, as best shown in FIGS. 1 and 2 of the drawings. The drive rollers 10 and 14 operate in conjunction with separate idler rollers 22 and 24 and each of which are respectively mounted on idler shafts 26 and 28. The drive rollers 10 and 12 are actually floatable relative to the drive roller 14. In like manner, the idler rollers 22 and 24 are similarly floatable.

It can be observed that not only are the drive rollers 10, 12 and 14 always located in contact with one another, but the idler roller 22 is located so as to be biased by the force of gravity to reside in contact with the driver roller 10. In like manner, the idler roller 24 is biased by the force of gravity toward the drive roller 14. Consequently, there is no permanently formed gap to receive a document, as such.

Any document D which is introduced into the region between the drive roller 10 and the idler roller 22 will automatically cause the idler roller 22 to shift upwardly and to the left, reference being made to FIG. 1. Furthermore, as the document D moves further in the drive path, it will cause the idler roller 24 to shift upwardly and to the left with respect to the drive roller 14. Consequently, the idler rollers only shift away from the respective drive rollers by a distance sufficient to accommodate the thickness of the particular document D.

The drive rollers are preferably formed of a rubber material so as to engage the document D without any slippage. However, the construction is such that steel surface rollers could easily be employed, since they will adjust their relative positions to accommodate the document D. The idler rollers are typically made of a metal, such as steel, and have weight relative to the document D passing through the document path. As a result, it can be observed that there is no fixed dimensional gap and the shifting of the idler rollers will vary depending on the thickness of the document.

In actuality, the idler rollers will shift relative to the drive rollers in order to accommodate the thickness of a document. By reference to FIG. 4, it can also be observed that the drive shafts 16 and 18 are actually shiftable in eyelets or slots 36 and 38, respectively. However, the drive shaft 20 is actually fixed in position, since it receives a driving power, as hereinafter described, and transfers that power to the drive rollers 10 and 12. Hence, the drive roller 14 actually functions as a powered drive roller.

By reference to FIG. 4, it can be seen that both of the drive rollers 10 and 14 will rotate in a counterclockwise direction in the arrangement as shown and the drive roller 12 will rotate in an opposite or clockwise direction in the drive arrangement as shown. In like manner, both of the idler rollers 22 and 24 will rotate in a counterclockwise direction.

By further reference to FIG. 4, it can be observed that the idler rollers 22 and 24 have their respective idler roller shafts 26 and 28 also located within eyelets or grooves 40 and 42, respectively. In this way, the idler rollers can shift upwardly and to the left with respect to the various drive rollers in the arrangement as shown in FIG. 4. This allows for adjustability of the thickness of the document D.

The lower drive roller 14, which functions as a powered drive roller, as aforesaid, on the opposite end of its shaft 20 is provided with a drive sprocket 46. The drive roller 14 is thereby powered from an electric motor 48 having a drive sprocket 50 and trained around the drive sprocket 50 and the sprocket 46 is a continuous drive belt 52. It should be understood that other forms of drive means could be provided for providing driving power to the drive roller 14 and which is then imparted to the drive rollers 10 and 12, as aforesaid.

By reference to FIG. 4, it can be observed that the drive rollers 10 and 12 are biased downwardly against the respective rollers therebeneath by the force of gravity. Thus, the drive roller 12 is forced into contact with the drive roller 14 and the drive roller 10 is forced into contact with the drive roller 12 by the force of gravity. In this way, all three drive rollers will operate together and, moreover, since they may not be of the same diametrical size, they will operate at the same surface velocity.

The drive rollers 10 and 12, however, are floating drive rollers, as aforesaid. They can be biased upwardly and to the left, reference being made to FIG. 4. Nevertheless, they will always remain in contact with one another. Thus, even if the drive rollers are not perfectly round or not precisely of the same diameter, they will still nevertheless rotate, such that their surface velocity is the same. As a result, any document will be driven smoothly at this surface velocity. The idler rollers 22 and 24 are both floatable, as aforesaid, that is, they can shift their axis of rotation slightly. Although the various drive rollers are approximately of the same diametrical size, the diametrical sizes of the driver rollers need not be the same. Consequently, tolerance in construction of the driver rollers is not critical. Due to the fact that the drive rollers are always in contact with one another, the surface velocity of the drive rollers is the same. Accordingly, the rotational velocity does not necessary have to be the same, but the surface velocity is always constant. Moreover, since the idler rollers are always in contact with the driver rollers, or otherwise with a document which, in turn, is in contact with the drive rollers, they do not have be precisely of the same diameter, since the idler rollers will also have the same surface velocity as the drive rollers.

By reference to FIG. 4, it can be observed that there is a horizontal force vector $F_1$ forcing each of the idler rollers toward the respective drive rollers 10 and 14 and also a vertical force vector $F_2$ forcing the drive rollers downwardly. Thus, the idler rollers will achieve their lowermost position and the position in contact with the respective drive rollers. However, they will actually be forced slightly upwardly and to the left in order to accommodate the thickness of a document D.

It is important to note that the upper idler roller 22 and the upper driver roller 10 are located so as to effectively grab the lower edge of a document introduced therebetween. As the document contacts the rotating driver roller 10, it will push away slightly the idler roller, but which rollers in combination will maintain a gripping force on the document. Rotation of the drive roller 10 will thereupon cause the document to move through the document scanning path. The same action occurs with the rollers 14 and 24, as well. As a result, the document will be driven precisely at the same rate of speed through the entire scanning operation.

It is important to maintain that constant movement of the document even as it passes beyond the driver rollers. Tray rollers, as hereinafter described in more detail, are provided so that the document is always driven through and beyond the document scanning path.

Located on one side of the document D is a light source 54, as best shown in FIG. 2, and which is connected to fiber optic cables 56. A detector 58 is located on the opposite side the light transmissive document D with respect to the light source 54. Thus, as light passes from the light source 54 and to the scanner or light sensitive detector 58, the image on that document is effectively scanned and digitized and stored. The exact mechanism for scanning and digitizing and storing the image of that document is not critical to this aspect of the invention and is therefore neither illustrated nor described in any further detail herein. However, it is to be noted that scanning, digitizing and storing of information is taught in my U.S. Pat. No. 5,093,734, dated Mar. 3, 1992, and in my U.S. Pat. No. 4,910,601, dated Mar. 20, 1990.

After the document has been scanned, it then passes through the scanning path, as shown in FIG. 2, and deflected slightly to the left, reference being made to FIG. 2, by means of a deflector 60. The document D then passes between a tray drive roller 62 and a tray idler roller 64. The tray roller 62 is actually a driven roller forcing the document into a tray 66. The tray drive roller 62 could be driven by the same drive source which drives the drive roller 14 or another drive source, as may be desired. In a preferred embodiment, however, the same drive motor is employed for this purpose.

As drive belt can be trained about the shaft which supports the tray driver roller 62 and connected with a drive belt or chain to a driver pulley on a motor. A pulley, for that matter, may be attached to the motor driven roller 14, such that the same motor may be used to drive the roller 14 and the tray driver roller 62.

One of the important aspects of the present invention is the fact that the positions of the drive rollers and their respective associated idler rollers can be shifted relative to the tray drive roller 62 and its associated tray idler roller 64. The various drive rollers 10, 12 and 14 all have their respective drive shafts 16, 18 and 20 mounted on a shiftable frame 70 which is hingedly mounted relative to a main frame 72 forming part of a housing. The shiftable frame is hingedly mounted by means of a pair of links 74 which are pivoted on the main frame 72. It can be observed by reference to FIGS. 5 and 6 that the axis of rotation of each of the links is concentric with the axis of rotation of the tray drive roller 62. Hence, when the rear frame 70 is shifted rearwardly away from the main frame 72, as shown in the position of FIG. 6, the axis of the respective drive rollers 10, 12 and 14 will not be dimensionally offset from that of the tray driver roller 62. The same, of course, holds true with respect to the idler rollers 22 and 24 and tray idler roller 64. In other words, the rear frame 70 can be shifted to the position as shown in FIG. 6 and re-shifted back to its original position as shown in FIG. 5 without even slightly altering the dimensional distances between the respective rollers.

It can be seen by reference to FIGS. 5 and 6 that the tray idler roller 64 and the tray drive roller 62 are both mounted on the main frame, as well as the idler rollers 22 and 24. Hence, the shiftable frame 70 can be shifted away from the main frame 72, as best shown in FIG. 6, for purposes of cleaning or otherwise adjusting the entire drive system. However, the positioning of the idler rollers and those rollers which allow for movement of the document into the tray is not affected. In addition, when the shiftable frame 70 is shifted back to its closed position, as shown in FIG. 5, the various rollers again perfectly match their original positions.

Each of the various rollers may be suitably mounted in bearings or bushings or like structure. However, the exact means for mounting of the various roller shafts and the bearings therefor is conventional in construction and, therefore, neither illustrated nor described in any further detail herein. It should also be understood that the lighting arrangement could be modified in accordance with conventional practice to provide reflected light or the like.

With respect to the floatable rollers, as previously described, the bearings for those rollers could be captured within the eyelet shaped openings in order to be floatable. They are constructed, however, so they cannot escape beyond the openings thereof.

Thus, there has been illustrated and described a unique and novel drive mechanism for digitizing scanning apparatus and which thereby fulfills all of the objects and advantages which have been sought. It should be understood that many changes, modifications, variations and other uses and applications which will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A drive system for digitizing scanning apparatus which allows for a uniform driving force to be applied to a document to be scanned without imposition of chatter to the document, said drive system comprising:
   a) a first drive roller and a second drive roller located in generally vertically spaced apart arrangement;
   b) a third drive roller located intermediately between and having its axis of rotation offset from the axis of rotation of said first and second drive rollers, said third drive roller providing driving contact between the first and second drive rollers;
   c) means providing a driving force to one of said drive rollers causing that drive roller to become a powered drive roller and which driving force is imparted to the other of the drive roller therefrom; and
   d) at least one floating idler roller in juxtaposed relationship to one of said drive rollers and being biased away from said one of said drive rollers by a thickness of a document to be received thereby and to receive a document therebetween.

2. The drive system for digitizing scanning apparatus of claim 1 further characterized in that a pair of idler rollers are provided in juxtaposed relationship to a pair of said drive rollers and which idler rollers can be raised away from the drive rollers by a distance only sufficient to receive the document.

3. The drive system for digitizing scanning apparatus of claim 2 further characterized in that a first of said idler rollers is disposed in juxtaposed relationship to the first drive roller and the second of the idler rollers is disposed in juxtaposed relationship to the second of the drive rollers.

4. The drive system of digitizing scanning apparatus of claim 2 further characterized in that each of said idler rollers are floating idler rollers, such that they can be biased upwardly and away from and downwardly and toward the drive roller with which it is associated.

5. The drive system of digitizing scanning apparatus of claim 1 further characterized in that said first, second and third drive rollers are all located in contact with one another, such that a driving force applied to one of said drive rollers automatically causes rotation of the other two drive rollers and at precisely the same rate of speed therefor.

6. The drive system of digitizing scanning apparatus of claim 5 further characterized in that each of said drive rollers have approximately the same diametrical size.

7. The drive system of digitizing scanning apparatus of claim 1 further characterized in that the axis of rotation of said third drive roller is spaced laterally away from the axis of rotation of the first drive roller and the second drive roller and that the axis of rotation of the first drive roller is parallel in space to and vertically aligned with the axis of rotation of the second drive roller.

8. A drive system for digitizing scanning apparatus which allows for uniform driving force to be applied to a document to be scanned without imposition of chatter to the document, said drive system comprising:
   a) a first drive roller and a second drive roller located in generally vertically spaced apart arrangement;
   b) a first idler roller disposed in juxtaposed relationship to and adapted for operative contact with said first drive roller and being shiftable with respect thereto to receive a document to be scanned;

c) a second idler roller disposed in juxtaposed relationship to said second drive roller and being shiftable with respect thereto to receive the document to be scanned therebetween; and d) means for allowing said idler rollers to be biased away from and toward said respective drive rollers.

9. The drive system for digitizing scanning apparatus of claim 8 further characterized in that said first and second idler rollers are located in generally vertically spaced apart relationship with respect to one another and said first and second drive rollers are located in generally vertical relationship with respect to one another.

10. The drive system for digitizing scanning apparatus of claim 8 further characterized in that each of said drive rollers have approximately the same diametrical size and each of said idler rollers have the same diametrical size.

11. The drive system for digitizing scanning apparatus of claim 10 further characterized in that the drive rollers have a larger diametrical size then said idler rollers.

12. A method for driving a document to be scanned and digitized through a scanning path and which allows for variations in thickness of successive documents and which also does not impart chatter to the documents being scanned, said method comprising:

a) passing a light transmissive document to be scanned between a first drive roller and a first idler roller operating in conjunction therewith;

b) passing said document past a second drive roller, but not in contact with that second drive roller;

c) passing the document to be scanned between a third drive roller and second idler roller operating in conjunction with the third drive roller; and d) allowing said first idler roller to shift relative to said first drive roller in order to accommodate the thickness of the document and allowing the second idler roller to shift relative to the third drive roller in order to accommodate the thickness of said documents.

13. The method of claim 12 further characterized in that said method comprises floatably shifting said first and second drive rollers relative to said third drive roller.

14. The method of claim 12 further characterized in that said method comprises providing a rotatable driving force to said third drive roller and allowing said third drive roller to impart a rotational driving force to said first and second drive rollers.

15. An apparatus for scanning and digitizing an image on a document for purposes of transmission or storage, said apparatus comprising:

a) a first drive roller and a second drive roller located in generally vertically spaced apart arrangement;

b) a third drive roller located intermediately between and having its axis of rotation offset from the axis of rotation of said first and second drive rollers, said third drive roller providing driving contact between the first and second drive rollers;

c) means providing a driving force to one of said drive rollers causing that drive roller to become a powered drive roller and which driving force is imparted to the other of the drive roller therefrom; and d) at least one floating idler roller in juxtaposed relationship to one of said drive rollers and receiving a document therebetween;

e) projecting light from a light source onto and through said document as said document passes between said drive rollers; and f) scanning the image on said document with respect to the light source and digitizing that image for ultimate storage and transmission.

* * * * *